United States Patent
Kuo et al.

(10) Patent No.: US 7,146,870 B2
(45) Date of Patent: Dec. 12, 2006

(54) CIRCULATION UNIT OF ROLLING ELEMENT WITH LUBRICATION SYSTEM

(75) Inventors: Chang-Hsin Kuo, Taichung (TW); Ya-Hui Liao, Taichung (TW)

(73) Assignee: Hiwin Technologies Corp., Taichung (TW)

(*) Notice: Subject to any disclaimer, the term of this patent is extended or adjusted under 35 U.S.C. 154(b) by 512 days.

(21) Appl. No.: 10/425,353

(22) Filed: Apr. 28, 2003

(65) Prior Publication Data

US 2004/0211627 A1    Oct. 28, 2004

(51) Int. Cl.
*F16H 27/02* (2006.01)
(52) U.S. Cl. ............ 74/89.44; 384/45; 184/105.3
(58) Field of Classification Search ........... 74/89.44, 74/89.43, 89.33, 89.32, 89.23; 384/13, 43, 384/45; 184/105.3, 105.1
See application file for complete search history.

(56) References Cited

U.S. PATENT DOCUMENTS

| | | | |
|---|---|---|---|
| 2,369,178 A * | 2/1945 | Richmond et al. | 184/5.1 |
| 3,955,648 A * | 5/1976 | Walker et al. | 184/105.3 |
| 4,893,650 A * | 1/1990 | Chisholm et al. | 137/539 |
| 4,977,927 A * | 12/1990 | Hill | 137/539 |
| 5,806,986 A * | 9/1998 | Barth et al. | 384/45 |
| 5,934,412 A * | 8/1999 | Higashi | 184/105.3 |
| 6,206,032 B1 * | 3/2001 | Hill | 137/539.5 |

* cited by examiner

*Primary Examiner*—David Fenstermacher
(74) *Attorney, Agent, or Firm*—Charles E. Baxley

(57) ABSTRACT

A circulation unit with lubrication system for rolling element includes a lubricant inlet formed with the sliding element and the lubricant inlet communicates with lubricant path such that lubricant can be directly fed to the rollers. The circulation unit has a compact structure which saves space and manufacturing cost.

25 Claims, 7 Drawing Sheets

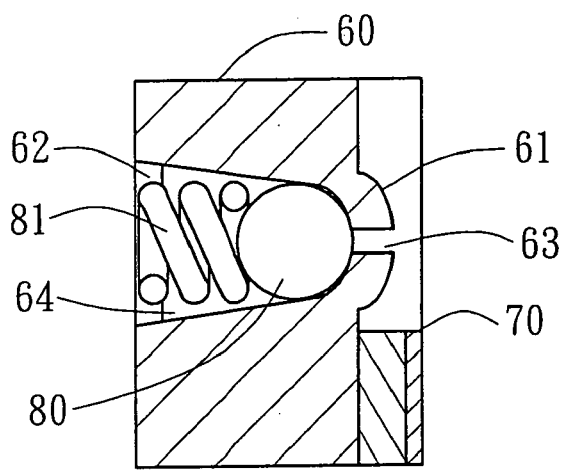
F I G. 5a
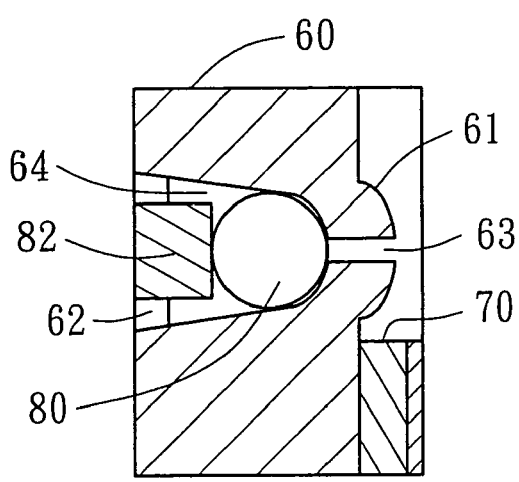
F I G. 5b
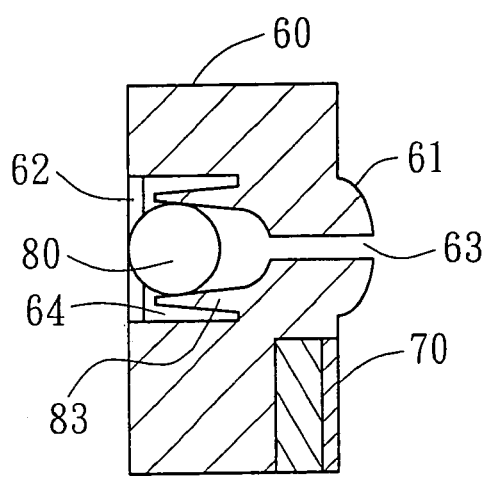
F I G. 5c

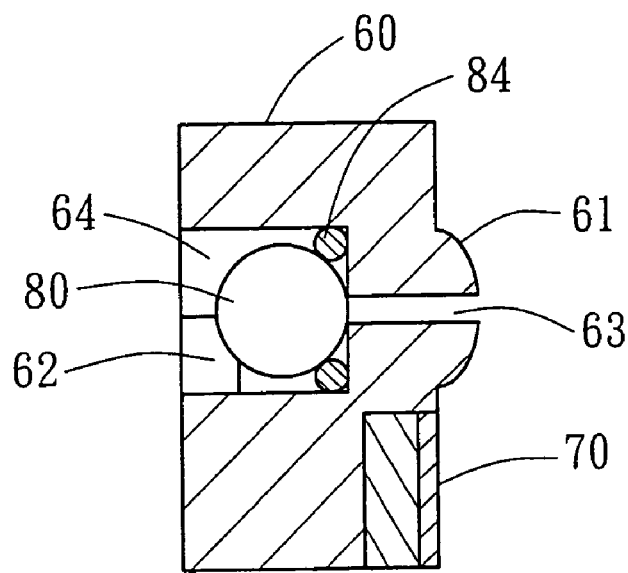
F I G. 5d
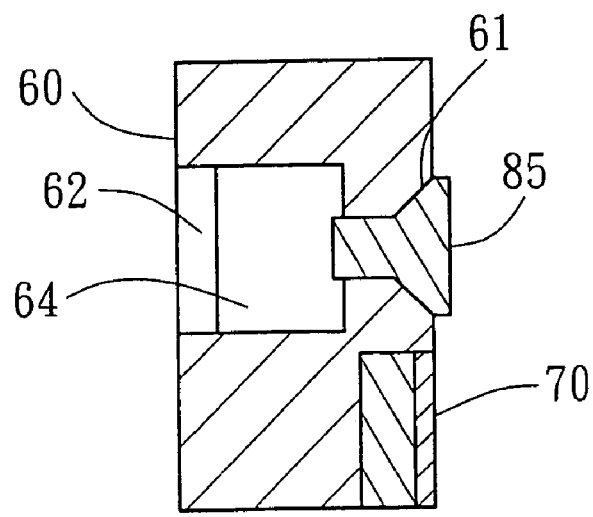
F I G. 5e

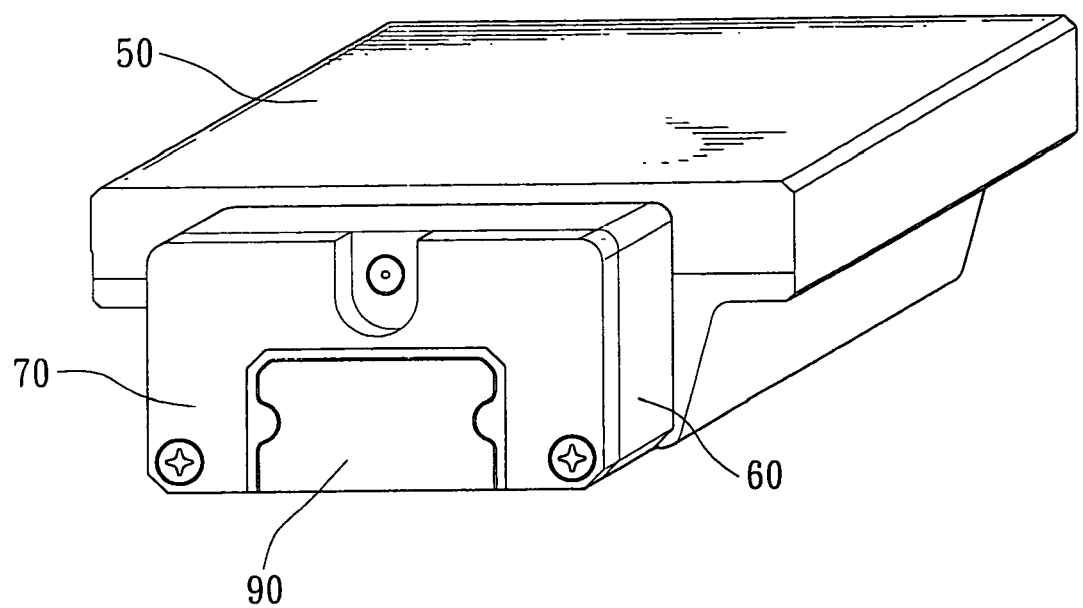
F I G. 6

CIRCULATION UNIT OF ROLLING ELEMENT WITH LUBRICATION SYSTEM

FIELD OF THE INVENTION

The present invention relates to a rolling element with a lubrication system which provides lubricant to the rollers of the rolling element and the lubrication system is compact.

BACKGROUND OF THE INVENTION

A conventional rolling element used in a linear rail such as shown in FIG. 7 generally includes a rails 10 and a sliding element 20 slidable on the rails 10 with rollers (not shown) located between the rails 10 and the sliding element 20. Two end caps 30 are connected to the sliding element 20 and a scrub element 31 is connected to each of the end caps 30. A lubricant inlet 32 extends through the scrub element 31 and is connected to the end cap 30 so as to feed lubricant to the rollers via the inlet 32. The lubricant inlet 32 protrudes from the sliding element 20 in the direction that is the same as the movement of the sliding element 20 so that the effective distance of the sliding element 20 is subtracted by the length "L" of the lubricant inlet 32. Nevertheless, the size of the lubricant inlet 32 has its minimum limitation and it is difficult to align the hole of the inlet 32 with the hole in the sliding element 20. It is also difficult to seal the connection of the lubricant inlet 32.

The present invention intends to provide a lubrication system for a rolling element wherein the lubrication system is integrally connected to the sliding element and occupies a limited space.

SUMMARY OF THE INVENTION

In accordance with one aspect of the present invention, there is provided a circulation unit with lubrication system for a rolling element, wherein the circulation unit a turn path and a lubricant path. A cooperation portion is defined in the circulation unit and a lubricant chamber is defined in the circulation unit. The lubricant path communicates with the turn path and the lubricant chamber so as to lubricate rollers. The cooperation portion is able to be engaged with a lubricant feeder.

The primary object of the present invention is to provide a circulation unit that can directly lubricate the rollers and has a compact structure that saves space and reduces the manufacturing cost.

Another object of the present invention is to provide a circulation unit wherein the lubricant cannot flow out from the circulation unit.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 5a is a cross sectional view to show a fourth embodiment of the circulation unit and the scrub member;

FIG. 5b is a cross sectional view to show a fifth embodiment of the circulation unit and the scrub member;

FIG. 5c is a cross sectional view to show a sixth embodiment of the circulation unit and the scrub member;

FIG. 5d is a cross sectional view to show a seventh embodiment of the circulation unit and the scrub member;

FIG. 5e is a cross sectional view to show a eighth embodiment of the circulation unit and the scrub member;

FIG. 6 is the sliding member movable on the linear rails, and

DETAILED DESCRIPTION OF THE PREFERRED EMBODIMENT

Figure 1:
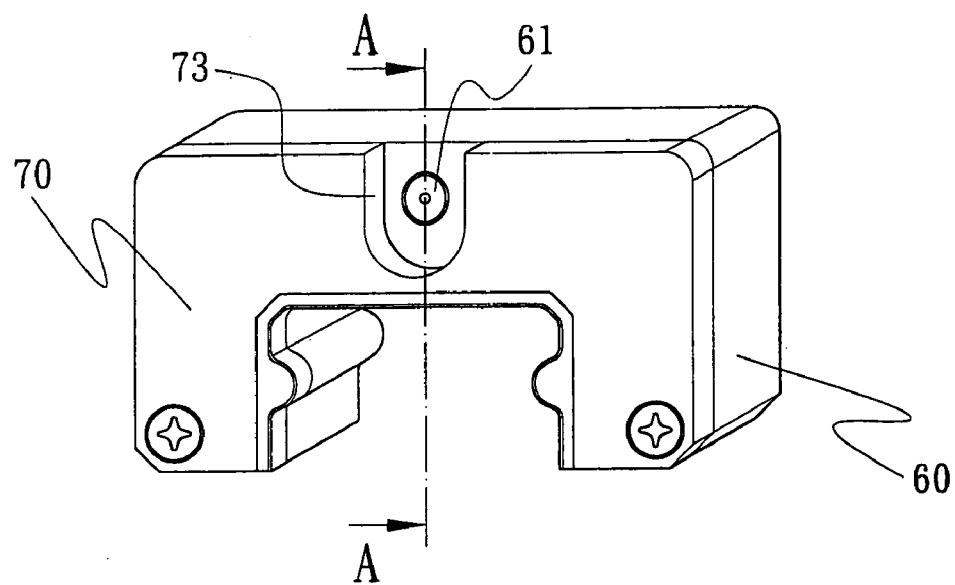
FIG. 1 is a perspective view to show the circulation unit and the scrub member.

FIG. 1 shows a combination of the scrub member 70 and the circulation unit 60, wherein the scrub member 70 is connected to an outside of the circulation unit 60 and includes an engaging recess 73. The scrub member 70 is designed to scrub debris and to prevent foreign objects from entering the path of the rollers. The circulation unit 60 allows the rollers (not shown) to turn and rolls. A lubricant path which is not shown is defined in the circulation unit 60 so as to lubricate the rollers. The circulation unit 60 has a cooperation portion 61 so as to directly connected to a lubricant feeder (not shown) without extra parts so that the structure of the circulation unit is compact which saves space and manufacturing cost.

Figure 2:
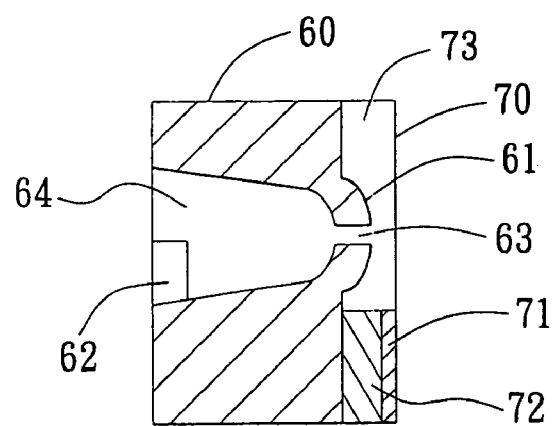
FIG. 2 is a cross sectional view along the A—A line in FIG. 1.

Referring to FIG. 2, the scrub member 70 is composed of a soft portion 71 and a metal portion 72, and the engaging recess 73 is defined in the scrub member 70 so as to cooperate with the cooperation portion 61 so that the lubricant feeder may directly engage with the cooperation portion 61. The cooperation portion 61 on the outside of the circulation unit 60 protrudes out from the circulation unit 60 and includes a lubricant inlet 63 which communicates with a lubricant chamber 64 which has a tapered inside. The lubricant path 62 is connected to the lubricant chamber so as to lubricate the rollers.

Figure 3:
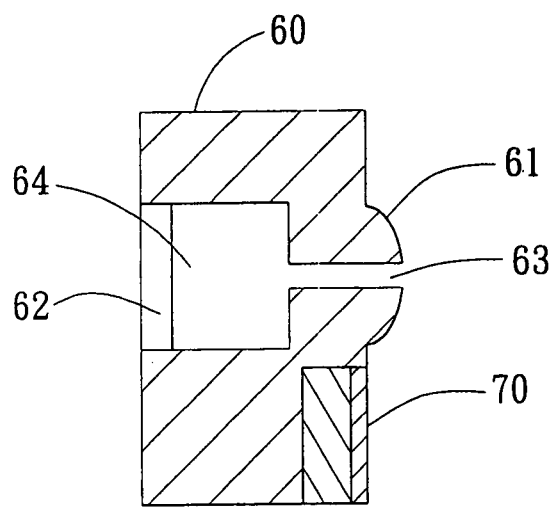
FIG. 3 is a cross sectional view to show a second embodiment of the circulation unit and the scrub member.

FIG. 3 shows that the cooperation portion 61 on the outside of the circulation unit 60 protrudes out from the circulation unit 60 and includes a lubricant inlet 63 which communicates with a lubricant chamber 64 which has a tapered inside. The lubricant path 62 is connected to the lubricant chamber 64 so as to lubricate the rollers. The outside of the circulation unit 60 is in flush with the scrub member 70 so that the scrub member 70 is well positioned and secured to the circulation unit 60. The lubricant feeder does not penetrate through the scrub member 70 and can be directly engaged with the cooperation portion 61 so as to provide the lubricant.

Figure 4:
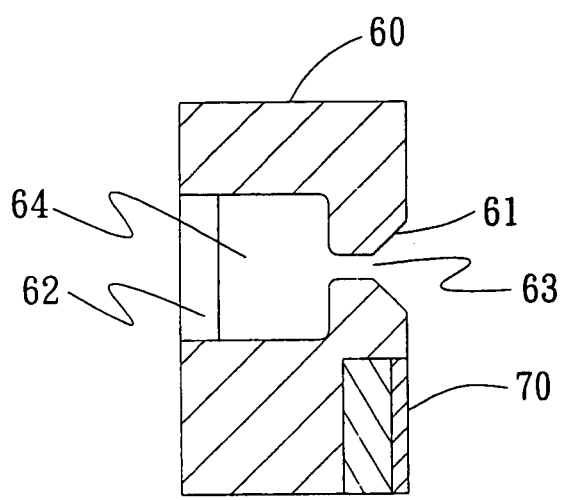
FIG. 4 is a cross sectional view to show a third embodiment of the circulation unit and the scrub member.

FIG. 4 shows that the outside of the circulation unit 60 is in flush with the scrub member 70. The cooperation portion 61 on the outside of the circulation unit 60 includes a lubricant inlet 63 which communicates with a lubricant chamber 64. The lubricant path 62 is connected to the lubricant chamber 64 so as to lubricate the rollers. The cooperation portion 61 on the outside of the circulation unit 60 is concave in the circulation unit 60 so as to connect to different types of lubricant feeder.

FIG. 5 shows different types of irreversible devices. FIG. 5a shows that the circulation unit 60 has a scrub member 70 connected to an outside thereof and when the lubricant feeder injects lubricant into the lubricant inlet 63, if the pressure overcomes the force of the spring 81, the ball 80 is pushed away so as to allow the lubricant to enter the lubricant chamber 64. The tapered inside of the lubricant chamber 64 makes the lubricant more easily to pass over the ball 80 and to enter the lubricant path 62 to lubricate the rollers. After the lubrication, the spring 81 pushes the ball 80 to seal the inlet 63 so that the lubricant cannot flows out from the circulation unit 60 via the inlet 63.

FIG. 5b shows that the spring in FIG. 5a is replaced by a flexible member 82. When the lubricant feeder injects lubricant into the lubricant inlet 63, if the pressure overcomes the force of the flexible member 82, the ball 80 is pushed away so as to allow the lubricant to enter the lubricant chamber 64. The tapered inside of the lubricant chamber 64 makes the lubricant more easily to pass over the ball 80 and to enter the lubricant path 62 to lubricate the rollers. After the lubrication, the flexible member 82 pushes the ball 80 to seal the inlet 63 so that the lubricant cannot flows out from the circulation unit 60 via the inlet 63.

FIG. 5c employs a ball 80 and flexible valves 83. When the lubricant feeder injects lubricant into the lubricant inlet 63, if the pressure overcomes the force of the flexible valves 83, the flexible valves 83 are opened wide and the lubricant passes over the ball 80 to enter the lubricant path 62 to lubricate the rollers. After the lubrication, the flexible valves 83 clamp the ball 80 to seal the inlet 63 so that the lubricant cannot flows out from the circulation unit 60 via the inlet 63.

FIG. 5d uses a ball 80 and a magnetic member 84. When the lubricant feeder injects lubricant into the lubricant inlet 63, if the pressure overcomes the force of the magnetic element 84 and the ball 80, the ball 80 is pushed away and the lubricant passes over the ball 80 to enter the lubricant path 62 to lubricate the rollers. After the lubrication, the magnetic element 84 attracts the ball 80 to seal the inlet 63 so that the lubricant cannot flows out from the circulation unit 60 via the inlet 63.

FIG. 5e uses a flexible plug 85 which is located in the recessed cooperation portion 61 and seals the inside and the outside of the circulation unit 60. A needle lubricant feeder is used to penetrate through the flexible plug 85 so send the lubricant into the lubricant chamber 64 to enter the lubricant path 62 to lubricate the rollers. After the lubrication, the needle is pulled out from the plug 85 and the flexible plug 85 seals the path that was formed by the needle such that the lubricant cannot flows out from the circulation unit 60.

Figure 5F:
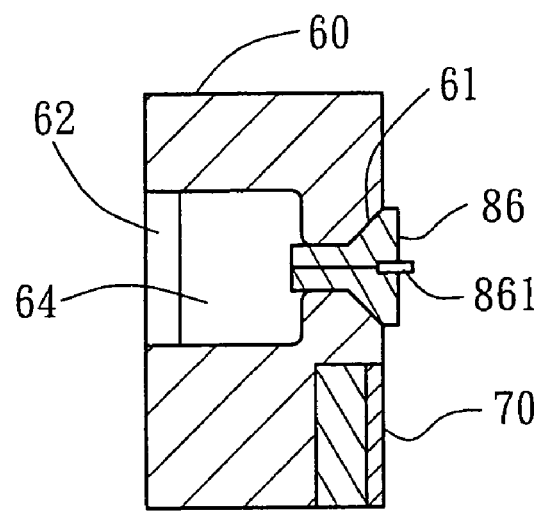
FIG. 5f is a cross sectional view to show a ninth embodiment of the circulation unit and the scrub member.

FIG. 5f uses a rubber plug 85 which is located in the recessed cooperation portion 61 and seals the inside and the outside of the circulation unit 60. The lubricant feeder is engaged with the inlet 861 in the rubber plug 86 and the lubricant is sent into the lubricant chamber 64 via the slits in the rubber plug 85 and enters the lubricant path 62 to lubricate the rollers. After the lubrication, the slits are sealed again such that the lubricant cannot flows out from the circulation unit 60.

Figure 5G:
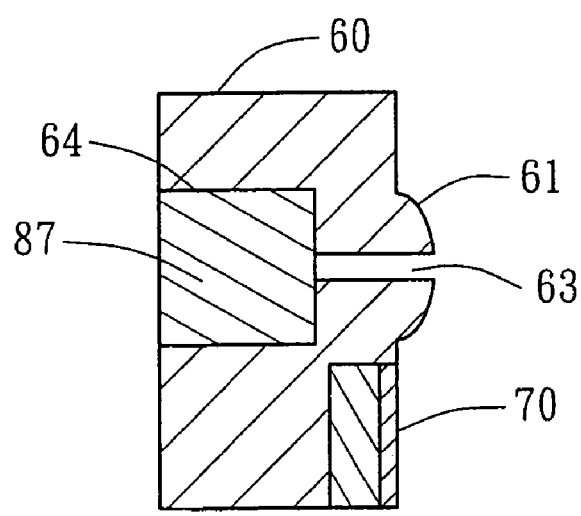
FIG. 5g is a cross sectional view to show a tenth embodiment of the circulation unit and the scrub member.
Figure 7:
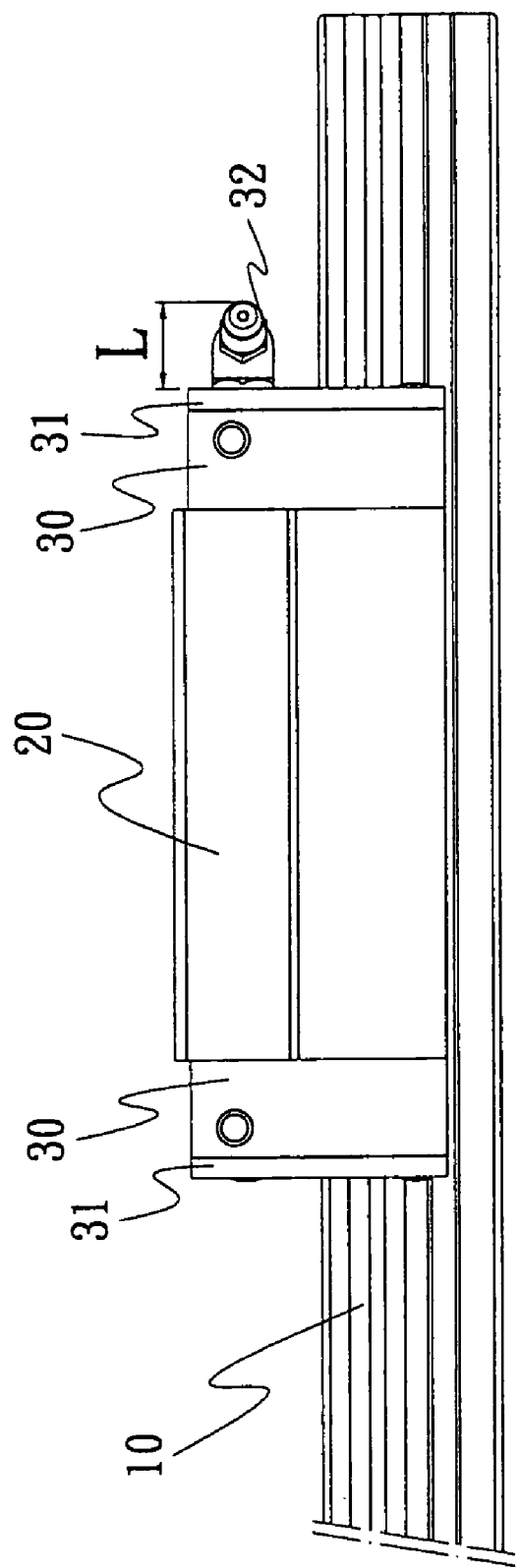
FIG. 7 shows conventional linear rails.

FIG. 5g uses a sponge 87 which is received in the lubricant chamber 64 so that when the lubricant is fed via the inlet 63, the lubricant enters the lubricant path 62 via the sponge 87 to lubricate the rollers. After the lubrication, the sponge 87 seals the inlet 63. The lubricant is not applied with pressure so that no lubricant flows out from the circulation unit 60.

FIG. 6 shows that the circulation unit 60 is used on linear rails and includes guide rails 90, a sliding element 50, rollers (not shown), a circulation unit 60 and a scrub element 70. The sliding element 50 are slidably engaged with the guide rails 90 and the rollers are located between the sliding element 50 and the guide rails 90 so that the sliding element 50 moves along the guide rails 90. The rollers roll in a circulation way by the circulation unit 60 so that the circulation unit 60 makes the rollers to turn and is convenient to provide lubricant so as to reduce the manufacturing space and save space.

While we have shown and described the embodiment in accordance with the present invention, it should be clear to those skilled in the art that further embodiments may be made without departing from the scope of the present invention.

What is claimed is:

1. A circulation unit with lubrication system for a rolling element, comprising:
   a turn path that can change the motion direction of the roller of said rolling element;
   a lubricant path;
   a cooperation portion;
   a lubricant chamber;
   wherein said lubricant path communicates with said turn path and said lubricant chamber so as to lubricate rollers of said rolling element, said cooperation portion adapted to cooperate with a lubricant feeder for feeding lubricant directly.

2. The circulation unit as claimed in claim 1, wherein the lubricant chamber has a tapered inside.

3. The circulation unit as claimed in claim 1, wherein the circulation unit has an irreversible device.

4. The circulation unit as claimed in claim 3, wherein the irreversible device includes a ball and a spring received in the lubricant chamber.

5. The circulation unit as claimed in claim 3, wherein the irreversible device includes a ball and a flexible element received in the lubricant chamber.

6. The circulation unit as claimed in claim 3, wherein the irreversible device includes a ball and flexible valves received in the lubricant chamber.

7. The circulation unit as claimed in claim 3, wherein the irreversible device includes a bead and magnetic elements received in the lubricant chamber.

8. The circulation unit as claimed in claim 3, wherein the irreversible device includes a flexible plug received in the cooperation portion so as to seal circulation unit.

9. The circulation unit as claimed in claim 3, wherein the irreversible device includes a rubber plug received in the cooperation portion so as to seal circulation unit.

10. The circulation unit as claimed in claim 3, wherein the irreversible device includes a sponge received in the lubricant chamber.

11. The circulation unit as claimed in claim 1, wherein the cooperation portion protrudes from the circulation unit.

12. The circulation unit as claimed in claim 1, wherein the cooperation portion is concave in the circulation unit.

13. A linear rail comprising guide rails, a sliding element, rollers, a circulation unit and a scrub element, the sliding element slidably engaged with the guide rails and the rollers located between the sliding element and the guide rails so that the sliding element moves along the guide rails, the scrub element connected to an outside of the circulation unit, the circulation unit including a turn path and a lubricant path, a cooperation portion for mating with a lubricant feeder, so as to feed lubricant into the circulation unit, and a lubricant chamber, the lubricant path communicating with the turn path and the lubricant chamber so as to lubricate rollers, the cooperation portion adapted to engage with a lubricant feeder.

14. The linear rail as claimed in claim 13, wherein the lubricant chamber has a tapered inside.

15. The linear rail as claimed in claim 13, wherein the circulation unit has an irreversible device.

16. The linear rail as claimed in claim 15, wherein the irreversible device includes a ball and a spring received in the lubricant chamber.

17. The linear rail as claimed in claim 15, wherein the irreversible device includes a ball and a flexible element received in the lubricant chamber.

18. The linear rail as claimed in claim 15, wherein the irreversible device includes a ball and flexible valves received in the lubricant chamber.

19. The linear rail as claimed in claim 15, wherein the irreversible device includes a ball and magnetic elements received in the lubricant chamber.

20. The linear rail as claimed in claim 15, wherein the irreversible device includes a flexible plug received in the cooperation portion so as to seal circulation unit.

21. The linear rail as claimed in claim 15, wherein the irreversible device includes a rubber plug received in the cooperation portion so as to seal circulation unit.

22. The linear rail as claimed in claim 15, wherein the irreversible device includes a sponge received in the lubricant chamber.

23. The linear rail as claimed in claim 13, wherein the cooperation portion protrudes from the circulation unit.

24. The linear rail as claimed in claim 13, wherein the cooperation portion is concave in the circulation unit.

25. The linear rail as claimed in claim 13, wherein the circulation unit extends to a plane of an outside of the scrub element.

* * * * *